(12) United States Patent
Yamamoto et al.

(10) Patent No.: US 8,476,348 B2
(45) Date of Patent: Jul. 2, 2013

(54) PROTEIN-FREE NATURAL RUBBER, LATEX THEREOF, AND METHOD FOR MANUFACTURING SAID RUBBER AND LATEX

(75) Inventors: Yoshimasa Yamamoto, Nagaoka (JP);
Seiichi Kawahara, Nagaoka (JP);
Oraphin Chaikumpollert, Nagaoka (JP); Phan Trung Nghia, Hanoi (VN)

(73) Assignee: National University Corporation Nagaoka University of Technology, Nagaoka (JP)

( * ) Notice: Subject to any disclaimer, the term of this patent is extended or adjusted under 35 U.S.C. 154(b) by 0 days.

(21) Appl. No.: 13/393,503

(22) PCT Filed: Aug. 31, 2010

(86) PCT No.: PCT/JP2010/064765
§ 371 (c)(1),
(2), (4) Date: May 2, 2012

(87) PCT Pub. No.: WO2011/027739
PCT Pub. Date: Mar. 10, 2011

(65) Prior Publication Data
US 2012/0208938 A1      Aug. 16, 2012

(30) Foreign Application Priority Data
Sep. 1, 2009   (JP) ................................. 2009-201287

(51) Int. Cl.
*C08K 5/19*       (2006.01)
*C08K 5/41*       (2006.01)
(52) U.S. Cl.
USPC ........................................................ 524/156

(58) Field of Classification Search
USPC ........................................................ 524/156
See application file for complete search history.

(56) References Cited

U.S. PATENT DOCUMENTS

| 5,910,567 | A | 6/1999 | Tanaka |
| 6,204,358 | B1 | 3/2001 | Tanaka |
| 6,239,253 | B1 | 5/2001 | Tanaka |
| 6,335,407 | B1 | 1/2002 | Tanaka |
| 2006/0252879 | A1 | 11/2006 | Tanaka |
| 2007/0135604 | A1 * | 6/2007 | Tashiro et al. .................... 528/1 |

FOREIGN PATENT DOCUMENTS

| JP | 6-56902 A | 3/1994 |
| JP | 6-56903 A | 3/1994 |
| JP | 2002-145904 A | 5/2002 |
| JP | 2004-099696 A | 4/2004 |
| JP | 2005-015614 A | 1/2005 |
| JP | 2006-307018 A | 11/2006 |
| JP | 2008-106099 A | 5/2008 |
| WO | 96/28500 A1 | 9/1996 |
| WO | 2005/012365 A1 | 2/2005 |
| WO | 2005/090412 A1 | 9/2005 |

* cited by examiner

*Primary Examiner* — Terressa Boykin
(74) *Attorney, Agent, or Firm* — Christensen O'Connor Johnson Kindness PLLC

(57) ABSTRACT

Provided is a protein-free natural rubber for which the risk of inducing allergic reactions is extremely low. Also provided are a latex of said rubber and a method for efficiently manufacturing said rubber and latex. In the provided manufacturing method, a urea compound, a surfactant, and a polar organic solvent are added to a natural rubber latex, and the proteins in said latex are denatured and then removed. This results in a protein-free rubber latex having a nitrogen content of at most 0.001% as measured by an RRIM test. Also, the amount of protein in a solid rubber obtained by drying the provided natural rubber latex is at most 0.5 μg/g as measured by an improved Lowry method.

7 Claims, 1 Drawing Sheet

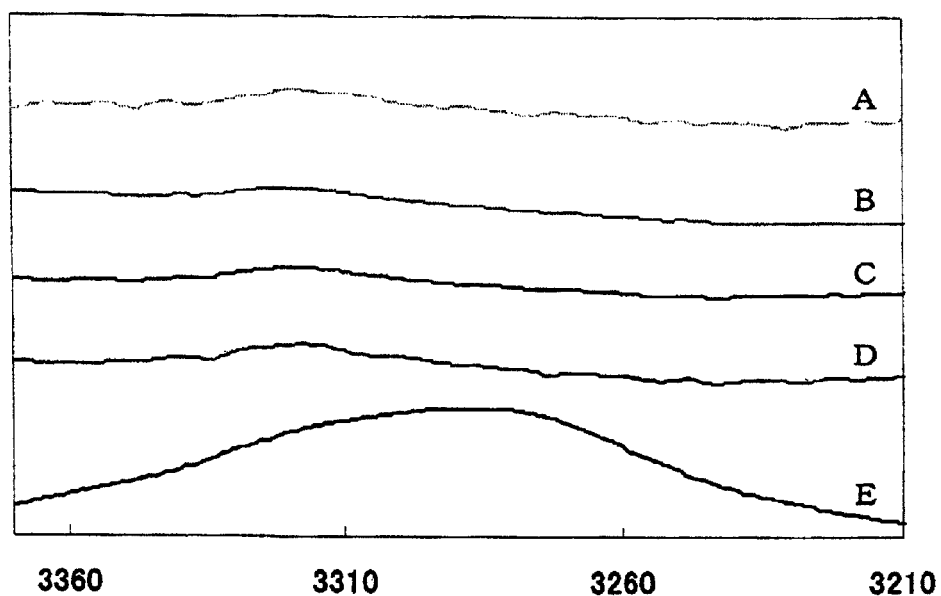

PROTEIN-FREE NATURAL RUBBER, LATEX THEREOF, AND METHOD FOR MANUFACTURING SAID RUBBER AND LATEX

TECHNICAL FIELD

The present invention relates to a protein-free natural rubber and a latex thereof each having substantially no risk of inducing allergy, and manufacturing methods therefor.

BACKGROUND ART

Natural rubber has characteristic properties such as large elongation, high elasticity, high tensile strength and tear strength, and satisfactory coating film strength. Thus, natural rubber is utilized in a wide variety of products including household products such as gloves, gloves for surgery, medical devices such as various catheters, nursing devices, and contraceptives. However, there is a report that the gloves for surgery, the medical devices such as the catheters formed of the natural rubber may cause immediate-type (type-I) allergy such as respiratory distress and anaphylactoid symptoms (e.g., angioedema, urticaria, and cyanosis). It is explained that such immediate-type allergy is induced by proteins serving as an antigen contained in natural rubber.

As a method of removing the proteins in natural rubber, there is proposed a method comprising adding a protease such as an alkaline protease and a surfactant to natural rubber latex to carry out protein decomposition treatment, and washing the latex by centrifugation treatment or the like (see Patent Literature 1).

Further, as a method of removing an allergenic proteins which is hardly removed even by such treatment, there is proposed a method comprising adding an alkaline protease to natural rubber latex to carry out protein decomposition treatment, adding a protease having an exopeptidase activity to carry out protein decomposition treatment, and subjecting the proteins and a decomposition product thereof to removal treatment (see Patent Literature 2).

Meanwhile, the inventors of the present invention have proposed, as a method by which protein removal treatment can be carried out in an extremely short period of time, a protein removal treatment method comprising adding a urea derivatives and a surfactant to natural rubber latex to carry out protein denaturation treatment (see Patent Literatures 3 and 4).

CITATION LIST

Patent Literature

[PTL 1] JP 06-56902 A
[PTL 2] JP 2002-145904 A
[PTL 3] JP 2004-99696 A
[PTL 4] JP 2005-15614 A

According to the method described in each of those patent literatures, the proteins in natural rubber can be decomposed and removed at a high level. Specifically, there is a report that the amount of the proteins contained in natural rubber can be reduced to as extremely low a value as 0.02% or less in terms of a nitrogen content (N %) measured by the Kjeldahl method.

The proteins in natural rubber latex more strongly attach to natural rubber particles as the storage period becomes longer. It is therefore most effective to deproteinize fresh natural rubber latex immediately after isolation from rubber tree.

According to the method described in Patent Literature 4, a protein-denaturant formed of a urea derivatives can be added to fresh natural rubber latex (Fresh NR latex) within 7 days after isolation from rubber tree to carryout protein removal treatment, to thereby reduce the nitrogen content of the latex to 0.004%.

However, in the method described in each of those patent literatures, the proteins still remain in a small amount in natural rubber, and contain an allergenic proteins (allergen) in an amount sufficient to induce immediate-type allergy. Hence, there still remains a risk to people sensitive to latex allergy.

Accordingly, there is a demand for natural rubber and the latex thereof each having further removed therefrom an allergenic proteins contained in natural rubber, and efficient manufacturing methods therefor.

In the present invention, the "allergenic proteins" is defined as described below.

All proteins and decomposition products thereof (hereinafter, referred to as "whole protein") present in natural rubber latex sample contain a group of "antigen proteins" capable of producing antibodies in human serum. Further, the antibodies to be produced in human serum are classified into an IgE class antibody capable of inducing an allergic reaction and an IgE class antibody incapable of inducing an allergic reaction. Herein, among the "antigen proteins", an antigen protein that produces the IgE class antibody which may cause an allergic reaction is defined as an "allergenic proteins" to distinguish it from other antigen proteins.

SUMMARY OF INVENTION

Technical Problem

An object of the present invention is to provide protein-free natural rubber and its latex each having an extremely low risk of inducing allergy obtained by removing the allergenic proteins, and efficient manufacturing methods therefor.

Solution to Problem

The inventors of the present invention have discovered that the allergenic proteins are removed in an extremely efficient manner by, in the addition of a urea derivatives and a surfactant to natural rubber latex to carry out protein denaturation treatment in each of the methods described in Patent Literatures 3 and 4, further adding a polar organic solvent to the latex. Thus, the present invention has been completed.

That is, in the present invention, the following technical features 1. to 7. are adopted in order to achieve the object.

1. A manufacturing method for protein-free natural rubber latex, wherein a protein content of a solid rubber obtained by drying the natural rubber latex manufactured by the method is at a level of 0.001% or less in terms of a nitrogen content, that is measured by an RRIM test method, the method comprising: adding a urea derivatives, a surfactant, and a polar organic solvent to natural rubber latex; subjecting proteins in the latex to denaturation treatment; and removing the proteins subjected to the denaturation treatment.

2. A manufacturing method for protein-free natural rubber latex according to the above-mentioned item 1.; wherein, as the polar organic solvent, one kind or a mixture of two or more kinds selected from the group consisting of lower aliphatic alcohols each having 1 to 5 carbon atoms, ketones each having 3 and 4 carbon atoms, carboxylic acids each having 1 to 5 carbon atoms, and esters of the carboxylic acids each having 1 to 5 carbon atoms, is used in an amount of 0.001 to 30% by weight with respect to a rubber component of the natural rubber latex.

3. A manufacturing method for protein-free natural rubber latex according to the above-mentioned item 1. or 2.; wherein the removing of the proteins subjected to the denaturation treatment is carried out by centrifugation treatment.

4. A manufacturing method for a protein-free natural rubber, comprising adding an acid to protein-free natural rubber latex obtained by the manufacturing method according to any one of the above-mentioned items 1. to 3. to coagulate protein-free natural rubber.

5. A manufacturing method for protein-free natural rubber, comprising drying protein-free natural rubber latex obtained by the manufacturing method according to any one of the above-mentioned items 1. to 3.

6. Protein-free natural rubber latex; wherein a protein content of a solid rubber obtained by drying the natural rubber latex is at a level of 0.001% or less in terms of a nitrogen content, that is measured by an RRIM test method; and wherein a protein amount of the solid rubber obtained by drying the natural rubber latex is at a level of 0.5 µg/g or less, that is measured by a modified Lowry's method.

7. Protein-free natural rubber; wherein a protein content of natural rubber is at a level of 0.001% or less in terms of a nitrogen content, that is measured by an RRIM test method; and wherein a protein amount of a solid rubber obtained by drying a latex of natural rubber is at a level of 0.5 µg/g or less, that is measured by a modified Lowry's method.

Advantageous Effects of Invention

According to the present invention, the following remarkable effects can be obtained.
(1) Protein-free natural rubber latex having an extremely low risk of inducing allergy can be efficiently obtained in a short period of time.
(2) Protein-free natural rubber latex can be efficiently manufactured even when high-ammonia natural rubber latex unsuitable for protein removal is used as a raw material.
(3) Protein-free natural rubber latex obtained by the present invention can be utilized in a wide variety of products including household products such as gloves, gloves for surgery, medical devices such as catheters, nursing devices, and contraceptives. Hence, protein-free natural rubber latex is extremely useful as a high-safety raw material for manufacturing those products.

BRIEF DESCRIPTION OF DRAWING

FIG. 1 shows the measurement results of infrared absorption spectra of raw rubber films obtained in Examples, Comparative Example, and Reference Example of the present invention.

DESCRIPTION OF EMBODIMENTS

In the present invention, a protein-denaturant formed of a urea derivatives, a polar organic solvent, and a surfactant are added to a raw material natural rubber latex. Next, allergenic proteins in the latex is subjected to denaturation treatment and then removed to manufacture protein-free natural rubber latex.
(Raw Material Natural Rubber Latex)

As the raw material natural rubber latex, there may be used any of natural rubber latex (field latex) which has not been subjected to concentration treatment after isolation from rubber tree, fresh natural rubber latex within 14 days after isolation from rubber tree, and commercially available high-ammonia natural rubber latex. Herein, fresh natural rubber latex means a latex which has not been subjected to fermentation treatment. As such natural rubber latex, there is used a latex preferably within 3 months after isolation from rubber tree, particularly preferably within 7 days after the isolation, most preferably within 3 days after the isolation. Further, there is used a latex having a gel content of the latex of preferably 40% or less, particularly preferably 10% or less.

(Polar Organic Solvent)

A polar organic solvent miscible with water is preferably used as the polar organic solvent in the present invention. Preferred examples of the polar organic solvent include: lower aliphatic alcohols each having 1 to 5 carbon atoms, such as methanol, ethanol, 1-propanol, 2-propanol, 1-butanol, 2-butanol, tert-butanol, 1-pentanol, 2-pentanol, and 3-pentanol; ketones each having 3 and 4 carbon atoms, such as acetone and methyl ethyl ketone; carboxylic acids each having 1 to 5 carbon atoms, such as acetic acid and propionic acid; and esters of the carboxylic acids each having 1 to 5 carbon atoms (preferably lower alkyl esters each having 1 to 5 carbon atoms), such as ethyl acetate. Those polar organic solvents may be used alone or as a mixture of two or more kinds thereof.

It is preferred that the blending ratio of the polar organic solvent with respect to natural rubber latex be set to 0.001 to 30% by weight, particularly 0.01 to 10% by weight, more particularly 0.05 to 1% by weight with respect to the rubber component of natural rubber latex. When the blending ratio of the polar organic solvent is less than 0.001% by weight with respect to the rubber component, the denaturation of the allergenic proteins cannot be sufficiently improved. On the other hand, when the blending ratio of the polar organic solvent is more than 30% by weight with respect to the rubber component, there arises a problem such as coagulation of the rubber component in a protein denaturation treatment step.

(Protein Denaturant)

A urea-based compound or a urea complex salt is used as the protein-denaturant. The urea-based compound to be preferably used is a urea derivative represented by the following general formula (1) and urea derivatives thereof.

$$RNHCONH_2 \quad (1)$$

(In the formula, R represents H or an alkyl group having 1 to 5 carbon atoms.)

Examples of the urea derivative represented by the general formula (I) include urea, methyl urea, ethyl urea, n-propyl urea, i-propyl urea, n-butyl urea, i-butyl urea, and n-pentyl urea. Preferred examples of the urea derivative include urea, methyl urea, and ethyl urea.

Further, examples of the urea complex salt include $HNO_3 \cdot CO(NH_2)_2$, $H_3PO_4 \cdot CO(NH_2)_2$, $H_2C_2O_4 \cdot 2CO(NH_2)_2$, $Ca(NO_3)_2 \cdot 4CO(NH_2)_2$, $CaSO_4 \cdot 4CO(NH_2)_2$, $Mg(NO_3)_2 \cdot CO(NH_2)_2 \cdot 2H_2O$, and $CaSO_4 \cdot (5 \text{ to } 6)CO(NH_2)_2 \cdot 2H_2O$.

(Protein Denaturation Treatment)

The removal pretreatment of the allergenic proteins contained in natural rubber latex is carried out by adding the polar organic solvent and denaturant described above, and a surfactant to raw material natural rubber latex, and treating the mixture for about 1 minute to 5 hours, preferably about 1 minute to 2 hours, more preferably about 1 minute to 1 hour. The amount of the protein-denaturant to be added may be appropriately selected depending on properties of the denaturant to be used. In general, the protein-denaturant is added in an amount of about 0.001 to 10% by weight with respect to the rubber component of raw material natural rubber latex.

The pH of the latex during the protein removal pretreatment may be appropriately set. The temperature of the latex during the protein removal pretreatment may be appropriately selected depending on optimum temperatures of the polar organic solvent and the denaturant to be used. In general, the temperature is preferably set to 5 to 90° C., and in consideration of the stability of the latex, is more preferably set to 10 to 60° C.

(Protein Removal Treatment)

Natural rubber latex treated with the polar organic solvent and the protein-denaturant is further purified by separating a rubber component from allergenic proteins by means of centrifugation or the like to remove the proteins, to thereby yield protein-free natural rubber latex having no risk of inducing allergy, which may be used as an industrial raw material.

When the removal treatment of the allergenic proteins is carried out by centrifugation, the centrifugation treatment is carried out once or more. In general, it is preferred to carry out the centrifugation treatment twice or more to such an extent that disadvantages due to a loss in rubber component and a decrease in yield do not occur.

(Surfactant)

In the manufacture of protein-free natural rubber latex, it is preferred to add a surfactant as a stabilizer to the latex before the protein removal pretreatment or during the pretreatment. In particular, in the case of carrying out the protein removal treatment by adjusting the pH of high-ammonia natural rubber latex as a raw material to a neutral region, it is desired to add the surfactant in order to prevent the coagulation of the rubber component.

As the surfactant to be used in the manufacture of protein-free natural rubber latex of the present invention, there may be used any of various conventionally known anionic surfactants, nonionic surfactants, and cationic surfactants. It is preferred to use, as those surfactants, ones each exhibiting a stable surface activity in the range of pH 6 to 13, more preferably in the range of pH 9 to 12.

Hereinafter, there are shown surfactants which may be used in the present invention. The surfactants exemplified below may be used alone or as a mixture of two or more kinds thereof.

(Anionic Surfactant)

Examples of the anionic surfactant include carboxylic acid-based, sulfonic acid-based, sulfuric acid ester-based, and phosphoric acid ester-based anionic surfactants. Examples of the carboxylic acid-based anionic surfactant include a fatty acid salt having 6 to 30 carbon atoms, a polycarboxylic acid salt, a rosin acid salt, a dimer acid salt, a polymer acid salt, and a tall oil fatty acid salt. Of those, a carboxylic acid salt having 10 to 20 carbon atoms is suitably used. When the number of carbon atoms in the carboxylic acid-based anionic surfactant is less than 6, actions of dispersing and emulsifying proteins and impurities may become insufficient. On the other hand, when the number of carbon atoms is more than 30, the dispersibility in water may become poor.

Examples of the sulfonic acid-based anionic surfactant include an alkylbenzene sulfonic acid salt, an alkyl sulfonic acid salt, an alkyl naphthalene sulfonic acid salt, a naphthalene sulfonic acid salt, and a diphenyl ether sulfonic acid salt.

Examples of the sulfuric acid ester-based surfactant include an alkyl sulfuric acid ester salt, a polyoxyalkylene alkyl sulfuric acid ester salt, a polyoxyalkylene alkylphenylether sulfate, a tristyrenated phenol sulfuric acid ester salt, and a polyoxyalkylene distyrenated phenol sulfuric acid ester salt.

Examples of the phosphoric acid ester-based anionic surfactant include an alkyl phosphoric acid ester salt and a polyoxyalkylene phosphoric acid ester salt. Salts of those compounds include metal salts (of Na, K, Ca, Mg, Zn, and the like), ammonium salts, and amine salts (such as a triethanol amine salt).

(Nonionic Surfactant)

Examples of the nonionic surfactant include polyoxyalkylene ether-, polyoxyalkylene ester-, polyhydric alcohol fatty acid ester-, sugar fatty acid ester-, and alkyl polyglycoside-based surfactants.

Examples of the polyoxyalkylene ether-based nonionic surfactant include a polyoxyalkylene alkyl ether, a polyoxyalkylene alkylphenyl ether, a polyoxyalkylene polyol alkyl ether, a polyoxyalkylene styrenated phenol ether, a polyoxyalkylene distyrenated phenol ether, and a polyoxyalkylene tristyrenated phenol ether. Examples of the polyol include polyhydric alcohols each having 2 to 12 carbon atoms such as propylene glycol, glycerin, sorbitol, sucrose, pentaerythritol, and sorbitan.

Examples of the polyoxyalkylene ester-based nonionic surfactant include a polyoxyalkylene fatty acid ester. Examples of the polyhydric alcohol fatty acid ester-based nonionic surfactant include a fatty acid ester of a polyhydric alcohol having 2 to 12 carbon atoms and a fatty acid ester of a polyoxyalkylene polyhydric alcohol. More specific examples thereof include a sorbitol fatty acid ester, a sorbitan fatty acid ester, a fatty acid monoglyceride, a fatty acid diglyceride, and a polyglycerin fatty acid ester. Further, polyalkylene oxide adducts thereof (e.g., a polyoxyalkylene sorbitan fatty acid ester and a polyoxyalkylene glycerin fatty acid ester) may also be used.

Examples of the sugar fatty acid ester-based nonionic surfactant include fatty acid esters of sucrose, glucose, maltose, fructose, and polysaccharides, and polyalkylene oxide adducts thereof may also be used.

Examples of the alkyl polyglycoside-based nonionic surfactant include an alkyl glucoside, an alkyl polyglucoside, a polyoxyalkylene alkyl glucoside, and a polyoxyalkylene alkyl polyglucoside, and fatty acid esters thereof. Further, polyalkylene oxide adducts thereof may also be used. As an alkyl group in each of those nonionic surfactants, there is given, for example, an alkyl group having 4 to 30 carbon atoms. Further, as a polyoxyalkylene group, there is given one having an alkylene group having 2 to 4 carbon atoms, for example, one having an ethylene oxide addition mole number of about 1 to 50. As a fatty acid, there is given, for example, a linear or branched, saturated or unsaturated fatty acid having 4 to 30 carbon atoms.

(Cationic Surfactant)

Examples of the cationic surfactant include alkyl amine salt-type and alkyl amine derivative-type cationic surfactants, and quaternized products thereof, and an imidazolinium salt-type cationic surfactant. Examples of the alkyl amine salt-type cationic surfactant include salts of a primary amine, a secondary amine, and a tertiary amine. Examples of the alkyl amine derivative-type cationic surfactant include ones each having at least one of an ester group, an ether group, and an amide group in its molecule, such as a polyoxyalkylene (AO) alkyl amine and a salt thereof, an alkyl ester amine (including an AO adduct) and a salt thereof, an alkyl ether amine (including an AO adduct) and a salt thereof, an alkyl amide amine (including an AO adduct) and a salt thereof, an alkyl ester amide amine (including an AO adduct) and a salt thereof, and an alkyl ether amide amine (including an AO adduct) and a salt thereof.

Examples of the kinds of the salts include a hydrochloride, a phosphonate, an acetate, an alkylsulfuric acid ester, an alkylbenzenesulfonic acid, an alkylnaphthalene sulfonic acid, a fatty acid, an organic acid, an alkylphosphoric acid ester, an alkyl ether carboxylic acid, an alkylamide ether carboxylic acid, an anionic oligomer, and an anionic polymer.

Of the alkyl amine derivative-type cationic surfactants, specific examples of the acetate include coconut amine acetate and stearyl amine acetate. An alkyl group in each of the alkyl amine salt-type and alkyl amine derivative-type cationic surfactants is not particularly limited, and examples thereof include a linear or branched including Guerbet alkyl group having generally 8 to 22 carbon atoms.

Examples of the quaternized products of the alkyl amine salt-type and alkyl amine derivative-type cationic surfactants include products obtained by quaternizing the alkyl amine salt and the alkyl amine derivative with methyl chloride, methyl bromide, dimethyl sulfate, diethyl sulfate, and the like.

Specific examples thereof include: alkyl trimethylammonium halides such as lauryl trimethylammonium halide, cetyl trimethylammonium halide, and stearyl trimethylammonium halide; dialkyl dimethylammonium halides such as distearyl dimethylammonium halide; trialkyl methylammonium halides; dialkylbenzyl methylammonium halides; and alkylbenzyl dimethylammonium halides.

Examples of the imidazolinium salt-type cationic surfactant include 2-heptadecenyl-hydroxylethylimidazoline. Of the surfactants exemplified above, in particular, as the surfactants each exhibiting a stable surface activity in the range of pH 6.5 to 8.5, there are given, for example, a polyoxyethylene nonyl phenyl ether as a nonionic surfactant and a sodium polyoxyethylene alkyl phenyl ether sulfate as an anionic surfactant.

(Other Additives)

In a manufacturing method for a deallergenized natural rubber latex of the present invention, in addition to the components exemplified above, any other additive may be blended, as necessary. Examples of such other additive include the following. As a pH adjustor, there are given, for example: phosphates such as potassium primary phosphate, potassium secondary phosphate, and sodium phosphate; acetates such as potassium acetate and sodium acetate; acids such as sulfuric acid, acetic acid, hydrochloric acid, nitric acid, citric acid, and succinic acid, or salts thereof; and ammonia, sodium hydroxide, potassium hydroxide, sodium carbonate, and sodium hydrogen carbonate.

Further, as an enzyme, there are given, for example, a lipase, an esterase, an amylase, a laccase, and a cellulase. In addition, as a dispersant, there are given, for example, a styrenesulfonic acid copolymer, a naphthalenesulfonic acid formalin condensate, ligninsulfonic acid, a polycyclic aromatic sulfonic acid copolymer, a homopolymer/copolymer of acrylic acid and maleic anhydride, isobutylene-acrylic acid, and an isobutylene-maleic anhydride copolymer.

(Degree of "Protein-Free")

According to the present invention, proteins in a solid rubber obtained by drying natural rubber latex can be reduced to 0.001% or less in terms of a nitrogen content, which is measured by an RRIM test method, and a protein concentration of a solid rubber obtained by drying natural rubber latex can be reduced to a level of 0.5 µg/g or less, which is measured by a modified Lowry's method.

(Modified Lowry's Method)

The modified Lowry's method (ASTM D5712-99), which comprises the following two steps: subjecting a protein solution to a reaction with $Cu^{2+}$ under an alkaline condition; and reducing the reaction product with a Folin reagent, is a method to be frequently employed as a method for the quantitative analysis of the whole protein including allergenic proteins.

In the present invention, the amount of proteins was measured by the modified Lowry's method with a protein quantification kit manufactured by Bio-Rad Laboratories, Inc. Specifically, proteins contained in a sample were extracted with a phosphate acid buffer solution. The extracted proteins were subjected to a reaction with $Cu^{2+}$, and the reaction product was reduced with a Folin reagent and measured for its absorbance at 750 nm. Based on the measured absorbance, the amount of the proteins in terms of bovine γ-globulin was determined through the use of a calibration curve prepared with bovine γ-globulin as a standard substance.

In the present invention, protein-free natural rubber is manufactured by adding an acid to the resultant protein-free natural rubber latex to coagulate natural rubber. Preferred examples of the acid include formic acid, acetic acid, and sulfuric acid. The amount of the acid to be used is generally about 1 to 50% by weight with respect to the rubber component of natural rubber latex.

Further, in the present invention, films and various molded articles formed of protein-free natural rubber can be manufactured by drying protein-free natural rubber latex by a method such as casting.

EXAMPLES

Next, the present invention is further described by way of examples. However, the following specific examples are not intended to limit the present invention.

In the following examples, sodium lauryl sulfate (SLS: manufactured by KISHIDA CHEMICAL Co., Ltd.) as an anionic surfactant was used as a surfactant.

Example 1

High-ammonia natural rubber latex with 60.2% dry rubber content (DRC) and an ammonia content of 0.7% by weight manufactured by Golden Hope (Malaysia) was used as a raw material latex, and diluted with water so that the concentration was 30% DRC. To 100 parts by weight of the rubber component of the latex were added 3.3 parts by weight of SLS as an anionic surfactant and 0.083 part by weight of ethanol. Next, to 100 parts by weight of the rubber component of the latex was added 0.3 part by weight of urea as a denaturant, and the mixture was stirred at 25° C. for 60 minutes to carry out denaturation treatment.

The latex after the completion of the denaturation treatment was subjected to centrifugation treatment at 10,000 rpm for 30 minutes. A cream fraction in the upper layer thus separated was dispersed in a 1% SLS-0.025% ethanol aqueous solution so that the concentration was 30% DRC, and the second centrifugation treatment was carried out in the same manner as described above. In addition, the resultant cream fraction was dispersed again in a 1% SLS-0.025% ethanol aqueous solution, and the third centrifugation treatment was carried out in the same manner as described above. The resultant cream fraction was dispersed again in a 1% surfactant aqueous solution so that the concentration was 30% DRC to yield protein-free natural rubber latex.

Example 2

Protein-free natural rubber latex was obtained in the same manner as in Example 1 except that the same amount of 2-propanol was used in place of ethanol as the polar organic solvent in Example 1.

Example 3

Protein-free natural rubber latex was obtained in the same manner as in Example 1 except that the same amount of acetone was used in place of ethanol as the polar organic solvent in Example 1.

Example 4

Protein-free natural rubber latex was obtained in the same manner as in Example 1 except that the same amount of a nonionic surfactant "RHEODOL TW-O120V" (manufactured by Kao Corporation: polyoxyethylene sorbitan monooleate) was used in place of SLS as the surfactant in Example 1.

Example 5

Protein-free natural rubber latex was obtained in the same manner as in Example 1 except that 8.3 parts by weight of acetone were used in place of ethanol as the polar organic solvent in Example 1.

Example 6

Protein-free natural rubber latex was obtained in the same manner as in Example 5 except that a fresh natural rubber latex within 1 day after isolation from rubber tree was used as the raw material latex in Example 5.

Example 7

Protein-free natural rubber latex was obtained in the same manner as in Example 1 except that the same amount of ethyl acetate was used in place of ethanol as the polar organic solvent in Example 1.

Example 8

Protein-free natural rubber latex was obtained in the same manner as in Example 5 except that the same amount of a nonionic surfactant "MYDOL 10" (manufactured by Kao Corporation: alkyl glucoside) was used in place of SLS as the surfactant in Example 5.

Example 9

Protein-free natural rubber latex was obtained in the same manner as in Example 1 except that 0.83 part by weight of acetic acid was used in place of ethanol as the polar organic solvent in Example 1.

Example 10

Protein-free natural rubber latex was obtained in the same manner as in Example 1 except that 0.083 part by weight of ethanol and 0.083 part by weight of acetic acid were each used as the polar organic solvent in Example 1.

Comparative Example 1

Protein-free natural rubber latex was obtained in the same manner as in Example 1 except that no polar organic solvent was used in Example 1.

Comparative Example 2

Protein-free natural rubber latex was obtained in the same manner as in Example 4 except that no polar organic solvent was used in Example 4.

Comparative Example 3

Protein-free natural rubber latex was obtained in the same manner as in Example 6 except that no polar organic solvent was used in Example 6.

(Measurement of Nitrogen Content)

As an indicator of the amount of proteins contained in natural rubber, protein-free natural rubber latex obtained in each of Examples and Comparative Examples described above was casted onto a petri dish and dried to produce a solid rubber, which was used as a sample for measuring a nitrogen content.

Further, as a reference sample, a cast film was directly produced in the same manner from high-ammonia natural rubber latex (Reference Example 1) used as the raw material in Example 1. The sample of each of Examples, Comparative Examples, and Reference Example was measured for its nitrogen content (N %) by an RRIM test method (Rubber Reseach Institute of Malaysia (1973), 'SMR Bulletin No. 7') according to the following procedures. Table 1 shows the results. The RRIM test method is a test method also called a Kjeldahl method, and is a standard method for the quantification of nitrogen in proteins, amino acids, or the like.

(RRIM Test Method)

A catalyst formed of copper sulfate, potassium sulfate, and selenium and sulfuric acid were added to solid natural rubber, and the mixture was heated for about 1 hour. After that, a sodium hydroxide aqueous solution was added thereto, and the mixture was subjected to steam distillation. The distilled nitrogen component was trapped as ammonium borate and titrated with dilute sulfuric acid to determine a nitrogen content.

TABLE 1

|  | Polar organic solvent | Surfactant | Nitrogen content (% by weight) | Protein amount (μg/g) (modified Lowry's method) |
|---|---|---|---|---|
| Example 1 | Ethanol | SLS | 0.000[Note 1] | 0.0[Note 3] |
| Example 2 | 2-propanol | SLS | 0.000[Note 1] | 0.0[Note 3] |
| Example 3 | Acetone | SLS | 0.000[Note 1] | 0.2 |
| Example 4 | Ethanol | RHEODOL | 0.041 | [Note 2] |
| Example 5 | Acetone | SLS | 0.000[Note 1] | 0.0[Note 3] |
| Example 6 | Acetone | SLS | [Note 2] | 0.0[Note 3] |
| Example 7 | Ethyl acetate | SLS | 0.000[Note 1] | 0.0[Note 3] |
| Example 8 | Acetone | MYDOL | 0.000[Note 1] | 0.2 |
| Example 9 | Acetic acid | SLS | 0.013 | 0.0[Note 3] |
| Example 10 | Acetic acid Ethanol | SLS | 0.020 | 0.0[Note 3] |
| Comparative Example 1 | — | SLS | 0.012 | 10.7 |
| Comparative Example 2 | — | RHEODOL | 0.060 | [Note 2] |
| Comparative Example | — | SLS | [Note 2] | 9.0 |

TABLE 1-continued

| | Polar organic solvent | Surfactant | Nitrogen content (% by weight) | Protein amount (μg/g) (modified Lowry's method) |
|---|---|---|---|---|
| Example 3 | | | | |
| Reference Example 1 | — | — | 0.217 | 384.0 |

Note 1) Detection limit or less in the RRIM method.
Note 2) "—" means "unmeasured."
Note 3) Detection limit or less in the modified Lowry's method.

According to Table 1, the nitrogen content of protein-free natural rubber latex of each of Examples 1 to 3, in which high-ammonia natural rubber latex was treated with urea and the polar organic solvent, was not detected and drastically decreased as compared to Comparative Example 1, in which no polar organic solvent was used.

Further, also in Example 4, the nitrogen content of natural rubber latex drastically decreased as compared to Comparative Example 2, in which no polar organic solvent was used. Thus, it is clear that the polar organic solvent has an advantageous effect.

In addition, the amount of allergenic proteins also decreased to the detection limit or less (see Examples 5 and 6 and Comparative Examples 1 and 3).

According to those results, even in the case of using, as the raw material, high-ammonia natural rubber latex unsuitable for protein removal in a conventional technology, the addition of the polar organic solvent allowed protein-free natural rubber latex to be efficiently manufactured in a short period of time. Accordingly, the manufacturing methods for protein-free natural rubber and its latex according to the present invention have extremely high practical values.

(Infrared Absorption Spectrum)

Raw rubber films were prepared from the rubber latexes of Examples 1 to 3, Comparative Example 1, and Reference Example 1, and measured for their infrared absorption spectra. FIG. 1 shows the results.

In FIG. 1, the abscissa represents a wavenumber ($cm^{-1}$), and the ordinate represents an absorption intensity. Further, A, B, C, D, and E represent the spectra of the films obtained from Example 1, Example 2, Example 3, Comparative Example 1, and Reference Example 1, respectively.

According to FIG. 1, a peak at 3,280 $cm^{-1}$ attributed to a long-chain peptide bond was observed in the film E obtained from an untreated high-ammonia natural rubber latex. The peak at 3,280 $cm^{-1}$ disappeared in the films A, B, and C each obtained by treating the high-ammonia natural rubber latex with urea, the polar organic solvent, and the surfactant and the film D obtained by treating high-ammonia natural rubber latex with urea and the surfactant.

Further, a peak at 3,320 $cm^{-1}$ attributed to a short-chain peptide bond was not observed as well. The results revealed that substantially all proteins detectable in the infrared absorption spectra were removed.

INDUSTRIAL APPLICABILITY

Protein-free natural rubber latex obtained in the present invention has an extremely low risk of inducing allergy, and hence can be utilized in a wide variety of products including household products such as gloves, gloves for surgery, medical devices such as catheters, nursing devices, and contraceptives.

The invention claimed is:

1. A manufacturing method for protein-free natural rubber latex, wherein a protein content of a solid rubber produced by drying the natural rubber latex manufactured by the method is at a level of 0.001% or less in terms of a nitrogen content, that is measured by an RRIM test method, the method comprising:
   (a) adding a urea derivative, a surfactant, and a polar organic solvent to natural rubber latex;
   (b) subjecting proteins in the latex to denaturation treatment; and
   (c) removing the proteins subjected to the denaturation treatment.

2. A manufacturing method for protein-free natural rubber latex according to claim 1, wherein, as the polar organic solvent, one kind or a mixture of two or more kinds selected from the group consisting of lower aliphatic alcohols each having 1 to 5 carbon atoms, ketones each having 3 and 4 carbon atoms, carboxylic acids each having 1 to 5 carbon atoms, and esters of the carboxylic acids each having 1 to 5 carbon atoms, is used in an amount of 0.001 to 30% by weight with respect to a rubber component of the natural rubber latex.

3. A manufacturing method for protein-free natural rubber latex according to claim 1 or 2, wherein the removing of the proteins subjected to the denaturation treatment is carried out by centrifugation treatment.

4. A manufacturing method for protein-free natural rubber, comprising adding an acid to protein-free natural rubber latex produced by the manufacturing method of claim 1 to coagulate protein-free natural rubber.

5. A manufacturing method for protein-free natural rubber, comprising drying protein-free natural rubber latex produced by the manufacturing method of claim 1.

6. Protein-free natural rubber latex produced by the manufacturing method of claim 1, wherein a protein content of a solid rubber produced by drying the natural rubber latex is at a level of 0.001% or less in terms of a nitrogen content, that is measured by an RRIM test method, and wherein a protein amount of the solid rubber produced by drying the natural rubber latex is at a level of 0.5 μg/g or less, that is measured by a modified Lowry's method.

7. Protein-free natural rubber produced by the manufacturing method of claim 4 or 5, wherein a protein content of natural rubber is at a level of 0.001% or less in terms of a nitrogen content, that is measured by an RRIM test method, and wherein a protein amount of a solid rubber produced by drying a latex of natural rubber is at a level of 0.5 μg/g or less, that is measured by a modified Lowry's method.

* * * * *